United States Patent [19]

Uchida et al.

[11] Patent Number: 4,667,259
[45] Date of Patent: May 19, 1987

[54] NON-MAGNETIC PART IN MAGNETIC HEAD ASSEMBLY

[75] Inventors: Noriaki Uchida; Makoto Ushijima; Etsuo Yanagisawa, all of Tochigi, Japan

[73] Assignee: Hitachi Metals, Ltd., Tokyo, Japan

[21] Appl. No.: 724,469

[22] Filed: Apr. 18, 1985

[30] Foreign Application Priority Data

Apr. 19, 1984 [JP] Japan ................................. 59-79254

[51] Int. Cl.$^4$ ...................... G11B 5/187; G11B 5/127
[52] U.S. Cl. .................................... 360/122; 360/118; 360/125; 360/110
[58] Field of Search ............... 360/110, 115, 119, 120, 360/122, 123, 125, 126, 118, 103; 428/472; 501/139, 137

[56] References Cited

U.S. PATENT DOCUMENTS

| | | | |
|---|---|---|---|
| 3,819,990 | 6/1974 | Hayashi et al. | 501/139 X |
| 3,846,840 | 11/1974 | Childers et al. | 360/121 X |
| 4,055,438 | 10/1977 | Wada et al. | 501/139 |
| 4,222,783 | 9/1980 | Atsumi et al. | 501/139 X |
| 4,392,167 | 7/1983 | Joormann | 360/120 |
| 4,406,722 | 9/1983 | Chow et al. | 360/126 |
| 4,430,440 | 2/1984 | Wada et al. | 360/122 X |
| 4,443,825 | 4/1984 | Wank | 360/104 |

FOREIGN PATENT DOCUMENTS

| | | | |
|---|---|---|---|
| 0143217 | 11/1979 | Japan | 360/122 |
| 0089915 | 7/1980 | Japan | 360/122 |

OTHER PUBLICATIONS

Secrist et al., Ceramic Material for Recording Heads, vol. 12, No. 6, Nov. 1969, IBM.

Primary Examiner—Robert S. Tupper
Assistant Examiner—Andrew L. Sniezek
Attorney, Agent, or Firm—Finnegan, Henderson, Farabow, Garrett & Dunner

[57] ABSTRACT

A non-magnetic part bonded to a magnetic core portion made of Ni-Zn ferrite in a magnetic head assembly which is made of a ceramic material comprised of 30 to 50 volume % of $TiO_2$ and 70 to 50 volume % of $Ba_2Ti_9O_{20}$ and $BaAl_2Ti_5O_{14}$ wherein the volume ratio of $Ba_2Ti_9O_{20}$ to the total volume of $Ba_2Ti_9O_{20}$ and $BaAl_2Ti_5O_{14}$ is 0.05 to 0.5.

8 Claims, 7 Drawing Figures

NON-MAGNETIC PART IN MAGNETIC HEAD ASSEMBLY

BACKGROUND OF THE INVENTION

The present invention relates to a non-magnetic part to be bonded to a magnetic core portion made of Ni-Zn ferrite in a magnetic head assembly.

A typical construction of a magnetic head assembly is described in U.S. Pat. No. 3,846,840 to Childers and Elser. In it, a magnetic head assembly is composed of three like layers joined in a sandwich structure, the center layer being a read/write layer and the outer layers being erase layers wherein each layer has a magnetic core portion having a magnetic gap formed by two legs and a non-magnetic spacer portion joined to one of the legs. The magnetic core portion is generally made of Ni-Zn ferrite, because it is readily machinable to a constant width, highly permeable for a high frequency A.C. magnetic flux and resistant to abrasion or wear.

A magnetic core made of Mn-Zn in a read/write layer is utilized in a magnetic recording device where a high coercive force of recording medium is utilized in order to attain a higher writing density.

Previously a magnetic head assembly is provided with a non-magnetic part made of a ceramic material consisting of two phases, $TiO_2$ and $Ba_2Ti_9O_{20}$ which is bonded to a magnetic core portion made of Ni-Zn ferrite. But the above-mentioned ceramic material consisting of two phases, $TiO_2$ and $Ba_2Ti_9O_{20}$ is too sensitive to composition variations. The mean thermal expansion coefficient measured in a temperature range of 100 to 400 degrees centigrade of a ceramic part having two phases $TiO_2$ and $Ba_2Ti_9O_{20}$ varies drastically depending on the volume ratio of $TiO_2$ to the total amount of $TiO_2$ and $Ba_2Ti_9O_{20}$, and it causes a difficulty for a manufacturer to produce a ceramic material having the desired a mean thermal expansion coefficient in actual production. Previously it was necessary to perform a strict selection of the non-magnetic parts produced, comparing the expansion coefficient of each non-magnetic part with the coefficients desired.

In the case that a non-magnetic part had a coefficient outside of the desired range was bonded to a Ni-Zn ferrite core, it caused some cracks in the core or an undesirable reduction of magnetic characteristics of the core because of strain induced stress in the core. Moreover the ceramic material which is a mixture of only $TiO_2$ and $Ba_2Ti_9O_{20}$ wears faster than a Ni-Zn ferrite core, when used as a non-magnetic portion in a magnetic head assembly which moves in contact with a magnetic recording medium.

SUMMARY OF THE INVENTION

Accordingly, it is an object of the invention to provide a non-magnetic part bonded or to be bonded to a magnetic core portion in a magnetic head assembly which is made of a material provided with a high wear resistance and an easily controlled thermal expansion coefficient, thereby to overcome the above-described problems.

It is another object of the invention to provide a non-magnetic part bonded to a magnetic core portion made of Ni-Zn ferrite in a magnetic head assembly comprising a read/write head unit sandwiched by a pair of erasing magnetic head units, each head unit of which is comprised of a magnetic core portion and non-magnetic spacer bonded to one of legs separated by a magnetic gap in the magnetic core portion.

To these ends, according to the invention, there is provided a non-magnetic part bonded to a magnetic core portion made of Ni-Zn ferrite in a magnetic head assembly which is made of a ceramic material comprised of 30 to 50 volume % of $TiO_2$ and 70 to 50 volume % of $Ba_2Ti_9O_{20}$ and $BaAl_2Ti_5O_{14}$ wherein the volume ratio of $Ba_2Ti_9O_{20}$ to the total volume of $Ba_2Ti_9O_{20}$ and $BaAl_2Ti_5O_{14}$ is 0.05 to 0.5.

The above and other objects, features and advantages of the invention will become clear from the following description of the preferred embodiment taken in conjunction with the accompanying drawings.

DESCRIPTION OF THE PREFERRED EMBODIMENT

Figure 1:
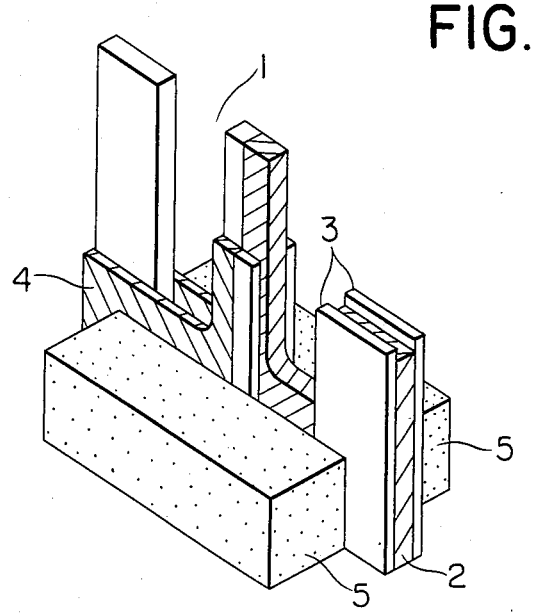
FIG. 1 is a perspective view of a core assembly for a magnetic head assembly in which the invention is applied.
Figure 2:
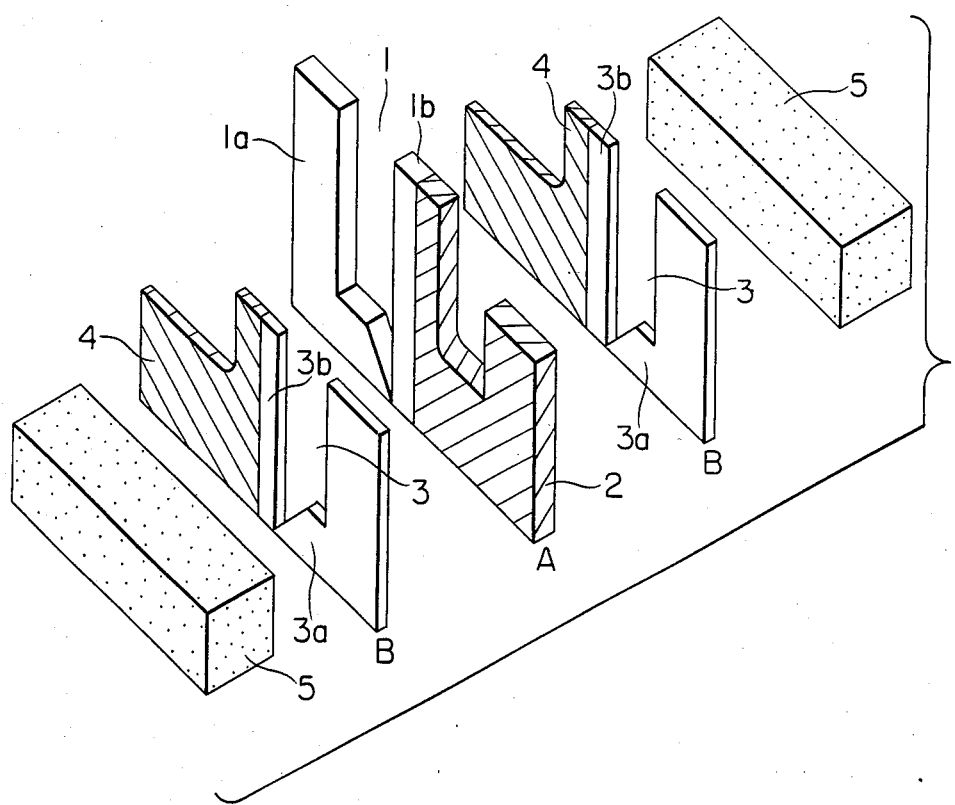
FIG. 2 is an exploded view of core assembly shown in FIG. 1.

The invention will be fully understood from the following description of the preferred embodiment. FIG. 1 is a schematic illustration of a magnetic head assembly in accordance with an embodiment of the invention, while FIG. 2 is an exploded view of the magnetic head assembly shown in FIG. 1. In these Figures, a reference numeral 1 designates a read/write magnetic head core made of an Ni-Zn ferrite. A first reinforcer 2 made of a non-magnetic ceramics is bonded by means of a glass in parallel with the magnetic gap of the magnetic head core 1. In order to obtain such a construction, a block having an L-shaped cross-section as the blank of a core 1a made of Ni-Zn ferrite and a block having an I-shaped cross-section as the blank of a core 1b made of Ni-Zn ferrite are positioned with respect to each other to form a predetermined magnetic gap therebetween, and are united with each other by glass-bonding to form a read/write member. Then, a block of a non-magnetic ceramic having a U-shaped cross-section as the blank of the reinforcer 2 is positioned to abut the united read/write member in parallel with the magnetic gap of the united read/write member. Then, both blocks are glass-bonded to each other and the integrated block in one body is cut at a predetermined width and finally polished to become a magnetic head assembly.

In FIGS. 1 and 2, a reference numeral 3 designates an erasing head which is composed of an L-shaped core 3a and an I-shaped core 3b made of Ni-Zn ferrite arranged to abut each other to form a predetermined magnetic gap and glass-bonded to each other. An L-shaped second reinforcer 4 made of a non-magnetic ceramic is glass-bonded in parallel to the magnetic gap of the erasing head 3. A reference numeral 5 denote side plates.

Thus, as will be clearly seen from FIG. 2, the second reinforcers 4 are positioned at both sides of the read/write magnetic head core 1, while the erasing magnetic head cores 3 are positioned at both sides of the first reinforcer 2 bonded in parallel to the gap of the read/write magnetic head core 1. The side plates 5 are placed at the outer sides of respective erasing head cores 3. These members are integrated by means of glass or resin to form the magnetic head assembly as shown in FIG. 1.

Figure 3A:
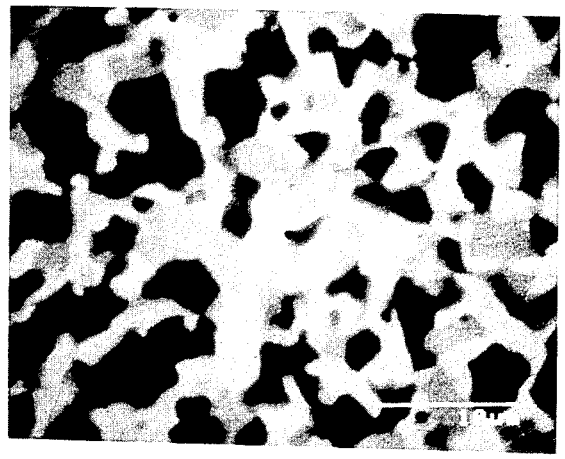
FIGS. 3(a) and 3(b) are photomicrographs of the cross-section of non-magnetic parts having three phases according to the invention.
Figure 3B:
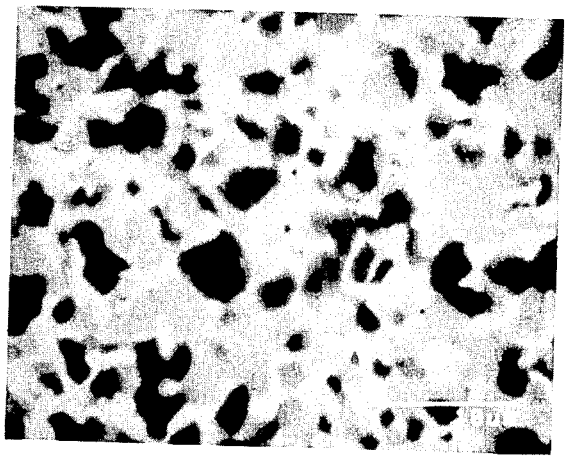

The reinforcers 2 and 4 are all made of a ceramic material comprised of $TiO_2$, $Ba_2Ti_9O_{20}$ and $BaAl_2Ti_5O_{14}$. FIGS. 3(a) and 3(b) are photomicrographs of the cross-section of the parts 2 and 4 having the three phases $TiO_2$, $Ba_2Ti_9O_{20}$ and $BaAl_2Ti_5O_{14}$. The ceramic material shown in FIG. 3(a) was produced from 76.95 weight % $TiO_2$, 20.95 weight % of $BaCO_3$ and 2.1 weight % of $Al_2O_3$. The ceramic material shown in FIG. 3(b) was produced from 76.2 weight % of $TiO_2$, 20.2 weight % of $BaCO_3$ and 3.6 weight % of $Al_2O_3$. In the both FIGS. 3(a) and 3(b), the black parts represent $TiO_2$ phase, the gray parts represent $BaAl_2Ti_5O_{14}$ and the rather white parts represent $Ba_2Ti_9O_{20}$ as identified by a scanning electron beam type of microscope. The gray $BaAl_2Ti_5O_{14}$ phase increases, the rather white $Ba_2Ti_9O_{20}$ phase decreases, and each $Ba_2Ti_9O_{20}$ particle becomes smaller and smaller.

The non-magnetic reinforcer according to the invention can be used in a magnetic head assembly described in U.S. Pat. No. 4,506,308 wherein a Mn-Zn ferrite is utilized as a read/write magnetic core material.

Figure 4:
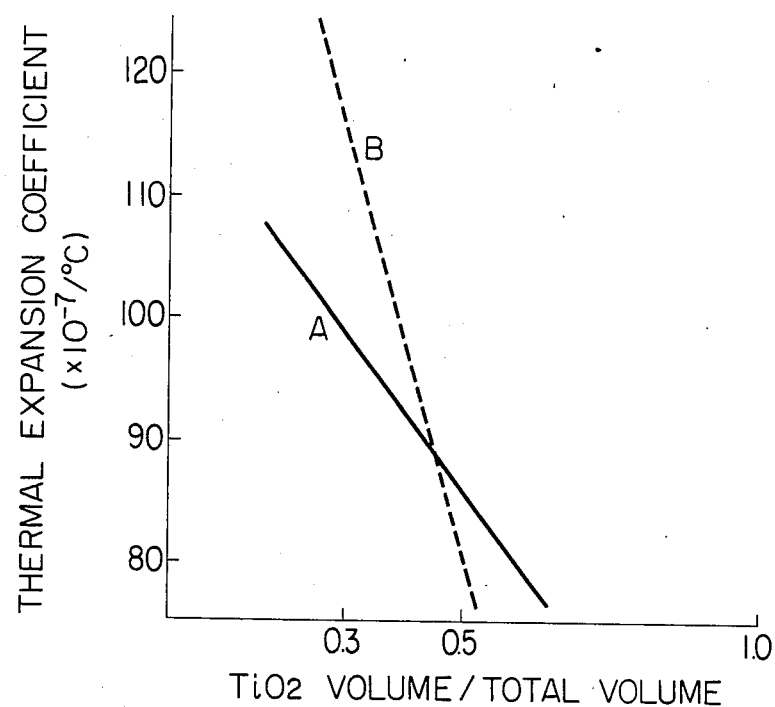
FIG. 4 is a graph showing the mean thermal expansion coefficient variation versus the volume ratio of the phases contained in a non-magnetic material.

The non-magnetic material produced according to the invention contains three phases $TiO_2$, $Ba_2Ti_9O_{20}$ and $BaAl_2Ti_5O_{14}$. By the invented phase construction, it is easy to control the mean thermal expansion coefficient measured temperatures of 100 to 400 centigrade degree to be provided to the non-magnetic part in the range of $86 \times 10^{-7}$ $\Delta 1/1/\text{deg}$. to $99 \times 10^{-7}$ $\Delta 1/1/\text{deg}$. For purposes of this invention, $\Delta 1/1/\text{deg}$. is defined as a coefficient of thermal expansion such as mm of change ($\Delta$mm) per mm (/mm) of length per degree centigrade (/deg.). Because the units of length cancel and do not effect the value measured for the coefficient, the units are simply those of length or ("1") or the length units can be omitted and the coefficient can be written as simply /degrees centigrade. This range is close to the thermal expansion coefficient of Ni-Zn ferrites, in order to avoid distortions or cracks in a magnetic core portion made of Ni-Zn ferrite during the bonding steps involving heating, due to the difference in their thermal expansion coefficients, if there is a large difference in coefficient of thermal expansion between the non-magnetic part and magnetic core part to be bonded to it. The ceramic material of the invention can be easily manufactured, because the variation of the coefficient depending on the volume ratio of $TiO_2$ to the total amount of $TiO_2$, $Ba_2Ti_9O_{20}$ and $BaAl_2Ti_5O_{14}$ is less than one in the previous two phases of ceramic material. The invented material comprised of three phases has an excellent wear resistance which is close to one of Ni-Zn ferrite materials. The $BaAl_2Ti_5O_{14}$ phase serve to enhance the wear resistance and the controllability of the thermal expansion coefficient to be provided to the ceramic material. The variation of thermal expansion coefficients versus the volume ratio of $TiO_2$ to the total volume of the compositions contained in a material is shown in FIG. 4. The curves B and A represents respectively a ceramic material having no $BaAl_2Ti_5O_{14}$ phase and a ceramic material wherein about 70 volume % of $Ba_2Ti_9O_{20}$ phase is substituted by $BaAl_2Ti_5O_{14}$ phase. As understood by the comparison of the curve B with the curve A, the variation dependence of thermal expansion coefficients on the volume ratio of $TiO_2$ to the total volume of the compositions contained in a material is reduced by $BaAl_2Ti_5O_{14}$ substitution for $Ba_2Ti_9O_{20}$.

Figure 5:
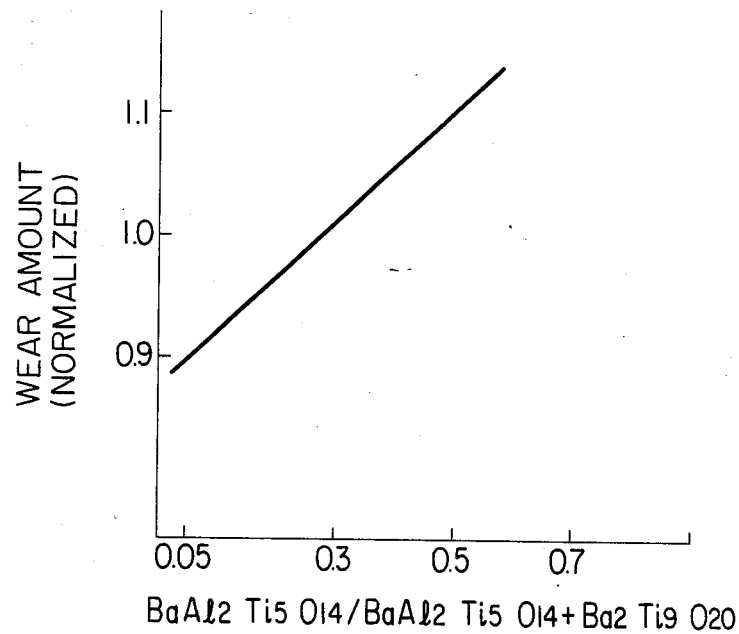
FIG. 5 is a graph showing the wear amount versus the volume ratio of $BaAl_2Ti_5O_{14}$ to the total amount of $BaAl_2Ti_5O_{14}$ and $Ba_2Ti_9O_{20}$.

In the invention, the amount of $TiO_2$ contained in the non-magnetic part is 30 to 50 volume % in order to provide a thermal expansion coefficient in the range of $86 \times 10^{-7}$ $\Delta 1/1/\text{deg}$. to $99 \times 10^{-7}$ $\Delta 1/1/\text{deg}$. which is close to one of Ni-Zn ferrite material as shown in FIG. 4. The preferable volume ratio of $BaAl_2Ti_5O_{14}$ to the total volume of $BaAl_2Ti_5O_{14}$ and $Ba_2Ti_9O_{20}$ is one value in the range of 0.05 to 0.5, as shown in FIG. 5. Aluminum content in the ceramic material should not be excess, because the excess addition of Aluminum causes an apperance of undesirable phases as $Al_2O_3$ and others in it. Some other oxides as $SiO_2$, SrO, CaO, MgO, or $ZrO_2$ could be contained in the non-magnetic material in the invention without any serious deterioration of mechanical or magnetic characteristics of the material, if the content of $SiO_2$ is less than 0.5 weight % and the each content of the other oxides should not exceed 0.1 weight %.

It is preferable for the each phase to be distributed uniformly in the ceramic material invented. The mean particle size of each phase, $TiO_2$, $BaAl_2Ti_5O_{14}$ or $BaTi_9O_{20}$ is preferably less than 5 $\mu$m. Generally $BaAl_2Ti_5O_{14}$ phase and $BaTi_9O_{20}$ phase enclose the $TiO_2$ phase as shown in FIGS. 3(a) and 3(b).

The volume ratio of pores to the total volume of a non-magnetic part in the invention is preferably less than 0.005, in order to enhance the wear resistance and the control of the thermal expansion coefficient.

EXAMPLE

Titanium oxide, barium carbonate and aluminum oxide were mixed in a wet condition by a ball mill apparatus. The mixed material was sintered temporarily after it was dried. The temporarily sintered material was crushed and then milled. The milled powders were granulated with polyvinyl alcohol as binder material, and then compressed to be formed as a green body. Similarly various compositions of green bodies were produced, and then sintered at a temperature of 1300° C. The obtained products were further treated at 1200° C., 1000 atmospheric pressure and in Ar atmosphere for 1 hour. Subsequently they were annealed.

The measurements of thermal expansion coefficient were performed at temperatures ranging 100° to 400° C., in order to calculate the mean value of the coefficients in the temperature range.

Figure 6:
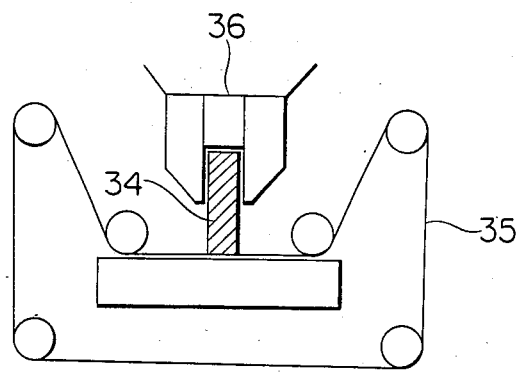
FIG. 6 is a schematic view of the apparatus to measure the amount of wear.

The measurements of wear resistance were performed by the apparatus shown in FIG. 6, where the test piece 34 having a shape of $3 \times 3 \times 10$ mm was loaded by 100 grams of weight, for one hour. The relative amount of wear for each test piece was measured, where the amount of wear for a Ni-Zn ferrite piece was normalized as equal to 1. The various phases contained in the test pieces were identified by a scanning electron beam type of microscope and the cross sections of some test pieces were photographed. The typical photomicrographs of the phases contained in the non-magnetic part according to the invention are shown in FIGS. 3(a) and 3(b).

What is claimed is:

1. A component of a magnetic head assembly, said assembly comprising:
   a core comprised of a Ni-Zn ferrite; and
   a non-magnetic reinforcing member bonded to said core, said reinforcing member being comprised of 30 to 50 volume % $TiO_2$ and 70 to 50 volume % of a mixture of $Ba_2Ti_9O_{20}$ and $BaAl_2Ti_5O_{14}$ wherein the volume ratio of $Ba_2Ti_9O_{20}$ to the total volume of $Ba_2Ti_9O_{20}$ and $BaAl_2Ti_5O_{14}$ is in the range of from 0.05 to 0.5.

2. The component of claim 1 wherein the material comprising said reinforcing member has a mean thermal expansion coefficient in the range of from $86 \times 10^{-7}$ to $99 \times 10^{-7}$/degree centigrade.

3. The component of claim 1 wherein the material comprising said reinforcing member has a pore ratio of less than 0.005.

4. The component of claim 1 wherein said core is bonded to said reinforcing member by a glass material.

5. A component of a magnetic assembly, said assembly comprising:
   a read/write core comprised of a Ni-Zn ferrite;
   a first reinforcing member abutted to an edge of said read/write core, said reinforcing member being comprised of 30 to 50 volume % $TiO_2$ and 70 to 50 volume % of a mixture of $Ba_2Ti_9O_{20}$ and $BaAl_2Ti_5O_{14}$ wherein the volume ratio of $Ba_2Ti_9O_{20}$ to the total volume of $Ba_2Ti_9O_{20}$ and $BaAl_2Ti_5O_{14}$ is in the range of from 0.05 to 0.5;
   a pair of erase cores, each of said erase cores being bonded on opposite sides of said read/write core, said erase cores being comprised of Ni-Zn ferrite; and
   second and third reinforcing members, of said second and third reinforcing members being abutted to one edge of one of said erase cores respectively, said second and third reinforcing members being comprised of 30 to 50 volume % $TiO_2$ and 70 to 50 volume % of a mixture of $Ba_2Ti_9O_{20}$ and $BaAl_2Ti_5O_{14}$ wherein the volume ratio of $Ba_2Ti_9O_{20}$ to the total volume of $Ba_2Ti_9O_{20}$ and $BaAl_2Ti_5O_{14}$ is in the range of from 0.05 to 0.5; said first, second and third reinforcing members being comprised of a three-component mixture of $TiO_2$, $BaAl_2Ti_5O_{14}$ and $Ba_2Ti_9O_{20}$.

6. The component of claim 5 wherein the material comprising said reinforcing members has a mean thermal expansion coefficient in the range of from $86 \times 10^{-7}$ to $99 \times 10^{-7}$/degree centigrade.

7. The component of claim 5 wherein the material comprising said reinforcing members has a pore ratio of less than 0.005.

8. The component of claim 5 wherein said core is bonded to said reinforcing members by a glass material.

* * * * *